US010736133B2

(12) United States Patent
Lei

(10) Patent No.: US 10,736,133 B2
(45) Date of Patent: Aug. 4, 2020

(54) BURST-BASED TRANSMISSION SCHEDULING IN A WIRELESS COMMUNICATION SYSTEM

(71) Applicant: Lenovo Innovations Limited (Hong Kong), Hong Kong (CN)

(72) Inventor: Haipeng Lei, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 15/752,517

(22) PCT Filed: Aug. 14, 2015

(86) PCT No.: PCT/CN2015/086924
§ 371 (c)(1),
(2) Date: Feb. 13, 2018

(87) PCT Pub. No.: WO2017/027998
PCT Pub. Date: Feb. 23, 2017

(65) Prior Publication Data
US 2018/0242353 A1 Aug. 23, 2018

(51) Int. Cl.
*H04W 72/14* (2009.01)
*H04W 72/12* (2009.01)
(Continued)

(52) U.S. Cl.
CPC .............. *H04W 72/14* (2013.01); *H04L 5/001* (2013.01); *H04L 5/0053* (2013.01);
(Continued)

(58) Field of Classification Search
CPC .............. H04W 72/1289; H04W 72/14; H04L 5/0094; H04L 5/0053; H04L 5/001
See application file for complete search history.

(56) References Cited

U.S. PATENT DOCUMENTS

2009/0092090 A1* 4/2009 Beems Hart .......... H04L 5/0037
370/329
2010/0165931 A1* 7/2010 Nimbalker ............ H04L 1/0028
370/329

(Continued)

FOREIGN PATENT DOCUMENTS

CN 101374283 A 2/2009
WO 2014/098701 A1 6/2014

OTHER PUBLICATIONS

Interdigital Communications, "On Scheduling and HARQ operation for LAA", 3GPP TSG-RAN WG1 Meeting #81 R1-153144, May 25-29, 2015, pp. 1-3.

(Continued)

*Primary Examiner* — Anez C Ebrahim
(74) *Attorney, Agent, or Firm* — Kunzler Bean & Adamson

(57) ABSTRACT

Apparatuses, methods, and systems are disclosed for burst-based transmission scheduling. One apparatus includes a processor and a memory that stores code executable by the processor. The code, in various embodiments, determines multiple consecutive uplink subframes to be transmitted from a user equipment. In a further embodiment, the code forms an uplink grant message to schedule transmission of the multiple consecutive uplink subframes. The apparatus may include a transmitter that provides the uplink grant message to the user equipment.

18 Claims, 7 Drawing Sheets

(51) Int. Cl.
  *H04L 5/00*   (2006.01)
  *H04W 16/14*  (2009.01)
(52) U.S. Cl.
  CPC ....... *H04L 5/0094* (2013.01); *H04W 72/1289* (2013.01); *H04W 16/14* (2013.01)

(56) References Cited

U.S. PATENT DOCUMENTS

| | | | |
|---|---|---|---|
| 2010/0208684 A1* | 8/2010 | Cho | H04L 5/0094 370/329 |
| 2011/0032924 A1 | 2/2011 | Lee et al. | |
| 2012/0281652 A1* | 11/2012 | Kim | H04W 72/042 370/329 |
| 2018/0092128 A1* | 3/2018 | Um | H04W 74/0808 |

OTHER PUBLICATIONS

Institute for Information Industr (III), "UL Transmission for LAA", 3GPP TSG RA WG2 #90 R2-152343, May 25-29, 2015, pp. 1-4.
Coolpad, "Consideration on the UL scheduling design for LAA", 3GPP TSG RAN WG1 Meeting #80 R1-150511, Feb. 9-13, 2015, pp. 1-3.

\* cited by examiner

500

| | Number 502 | |

| | Offset 506 | |

FIG. 5B

BURST-BASED TRANSMISSION SCHEDULING IN A WIRELESS COMMUNICATION SYSTEM

FIELD

The subject matter disclosed herein relates generally to wireless communications and more particularly relates to burst-based transmission scheduling in a wireless communication system.

BACKGROUND

The following abbreviations are herewith defined, at least some of which are referred to within the following description.

3GPP Third Generation Partnership Project
CCA Clear Channel Assessment
DL Downlink
ECCA Extended Clear Channel Assessment
eNB Evolved Node B
ETSI European Telecommunications Standards Institute
FBE Frame Based Equipment
FDMA Frequency Division Multiple Access
LAA Licensed Assisted Access
LBE Load Based Equipment
LBT Listen Before Talk
LTE Long Term Evolution
MCS Modulation and Coding Scheme
MU-MIMO Multi-User, Multiple-Input, Multiple-Output
OFDM Orthogonal Frequency Division Multiplexing
PCell Primary Cell
SC-FDMA Single Carrier Frequency Division Multiple Access
SCell Secondary Cell
UE User Entity/Equipment (Mobile Terminal)
UL Uplink
UMTS Universal Mobile Telecommunications System
WiMAX Worldwide Interoperability for Microwave Access In Wireless Communications networks, for example, in LTE systems using LAA, an unlicensed spectrum is used with assistance from a licensed carrier. LAA may facilitate a fair coexistence with other technologies over the unlicensed spectrum and satisfy various regulatory requirements in different countries and regions.

For regulation requirements in Europe, ETSI has specified two channel access mechanism (i.e., FBE and LBE). For these two channel access mechanisms, before starting transmissions on an operating channel, the equipment (i.e., FBE and LBE) may perform a CCA check by using energy detection with the CCA observation time not less than 20 microseconds ("us"). If the energy level in the channel does not exceed a predefined threshold corresponding to the power level, the equipment may consider the operating channel to be clear and may transmit immediately. In contrast, the equipment may consider the operating channel to be occupied and may continue to perform the CCA check. For FBE, the equipment may continue to perform the CCA check at an end of a frame period. For LBE, the equipment may start performing ECCA immediately until it can grab the channel. In some situations, LBE may have a higher channel access probability than FBE.

Although LBE may have a higher channel access probability than FBE, FBE may be more appropriate for LAA UL. For example, FBE can follow the LTE UL framework that a UE's UL transmission should be permitted by a serving eNB, FBE can avoid inter-UE blocking and enable UL multiplexing of multiple UEs in one subframe by FDMA and MU-MILO. FBE does not require a reservation signal, and FBE has a fixed timing relationship and UL transmission can always start from the first OFDM symbol of a subframe. Accordingly, in certain configurations, FBE may be used as a baseline for LAA UL operation.

To support UL multiplexing of multiple UEs in one subframe by FDMA or MU-MIMO, LBT/CCA should be synchronous between UEs one the same carrier. Otherwise, the first UE would reserve the operating channel and the other UEs would see it as occupied, which would block multiplexing of multiple UEs in a UL subframe. For example, in a configuration in which a first (e.g. UE1) and a second UE (e.g., UE2) operate in an asynchronous manner, if UE1 performs CCA before UE2 and UE1 will transmit data immediately on the unlicensed spectrum if UE1 passes its CCA. Then, when UE2 performs CCA, it will find the channel is occupied and cannot transmit data unless UE1 stops transmission. This inter-UE blocking issue may not only block multi-user multiplexing in one subframe but also may inhibit fairly sharing the unlicensed spectrum.

To avoid the inter-UE blocking issue for FBE and enable multi-user multiplexing in one subframe, LBT/CCA may be synchronized among the UEs. Specifically, in one cell, all served UEs may be synchronous and scheduled from the first UL subframe in one frame period. For example, a frame period may include an occupancy time followed by an idle period. LBT/CCA for all served UEs in a cell may occur at the end of the idle period. Thus, a UE may transmit only depending on an eNB's scheduling, thereby using the LTE UL framework. Because all the served UEs perform CCA in a synchronous manner, UL transmission can start only at the beginning of each frame period.

There are two kinds of scheduling methods for LAA UL, i.e., cross-carrier scheduling and self-scheduling. Cross-carrier scheduling used a licensed carrier to schedule unlicensed secondary carriers and can avoid using the eNB to perform a CCA check before each UL grant transmission. In contrast to cross-carrier scheduling, self-scheduling requires the eNB to perform the CCA check before each UL grant transmission. Therefore, compared to self-scheduling, cross-carrier scheduling enable the eNB to always have the opportunity to transmit the UL grant transmission. However, when there are many secondary carriers on the unlicensed spectrum that need to be scheduled from a few licensed carriers (that is especially true for one PCell to schedule many SCells on a 5 GHz unlicensed spectrum) cross-carrier scheduling for unlicensed SCells may lead to DL control resource congestion (i.e., not enough control resources to transmit many UL grant transmissions). Accordingly, signaling overhead for UL grant transmissions may be excessive.

BRIEF SUMMARY

Apparatuses for burst-based transmission scheduling are disclosed. Methods and systems also perform the functions of the apparatus. In one embodiment, the apparatus includes a processor and a memory that stores code executable by the processor. The code, in various embodiments, determines multiple consecutive uplink subframes to be transmitted from a user equipment. In a further embodiment, the code forms an uplink grant message to schedule transmission of the multiple consecutive uplink subframes. The apparatus may include a transmitter that provides the uplink grant message to the user equipment.

In a further embodiment, the code that forms the uplink grant message to schedule transmission of the multiple consecutive uplink subframes includes code that forms the uplink grant message to indicate a number of the multiple consecutive uplink subframes to be transmitted from the user equipment. In some embodiments, the code that forms the uplink grant message to indicate the number of the multiple consecutive uplink subframes to be transmitted from the user equipment includes code that forms the uplink grant message to include four bits to indicate the number of the multiple consecutive uplink subframes to be transmitted from the user equipment. In another embodiment, the code that forms the uplink grant message to indicative the number of the multiple consecutive uplink subframes to be transmitted from the user equipment includes code that forms the uplink grant message to include two bits to indicate the number of the multiple consecutive uplink subframes to be transmitted from the user equipment.

In another embodiment, the code that forms the uplink grant message to schedule transmission of the multiple consecutive uplink subframes includes code that forms the uplink grant message to indicate an offset for a last subframe of the multiple consecutive uplink subframes to be transmitted from the user equipment relative to a starting subframe of the multiple consecutive uplink subframes. In one embodiment, the transmitter provides the uplink grant message to the user equipment at least four milliseconds before a first subframe of a frame period that is to include the multiple consecutive uplink subframes.

A method for burst-based transmission scheduling, in one embodiment, includes determining, by use of a processor, multiple consecutive uplink subframes to be transmitted from a user equipment. In some embodiments, the method includes forming an uplink grant message to schedule transmission of the multiple consecutive uplink subframes. In a further embodiment, the method includes providing the uplink grant message to the user equipment.

In some embodiments, a first uplink subframe of the multiple consecutive uplink subframes is a first subframe of a frame period. In one embodiment, a maximum duration of the multiple consecutive uplink subframes is a maximum channel occupancy time. In some embodiments, forming the uplink grant message to schedule transmission of the multiple consecutive uplink subframes includes forming the uplink grant message to indicate a number of the multiple consecutive uplink subframes to be transmitted from the user equipment.

In some embodiments, forming the uplink grant message to indicate the number of the multiple consecutive uplink subframes to be transmitted from the user equipment includes forming the uplink grant message to include four bits to indicate the number of the multiple consecutive uplink subframes to be transmitted from the user equipment. In other embodiments, forming the uplink grant message to indicate the number of the multiple consecutive uplink subframes to be transmitted from the user equipment includes forming the uplink grant message to include two bits to indicate the number of the multiple consecutive uplink subframes to be transmitted from the user equipment.

In certain embodiments, forming the uplink grant message to schedule transmission of the multiple consecutive uplink subframes includes forming the uplink grant message to indicate an offset for a last subframe of the multiple consecutive uplink subframes to be transmitted from the user equipment relative to a starting subframe of the multiple consecutive uplink subframes. In some embodiments, providing the uplink grant message to the user equipment includes providing the uplink grant message to the user equipment at least four milliseconds before a first subframe of a frame period that is to include the multiple consecutive uplink subframes.

In one embodiment, an apparatus includes a receiver that receives an uplink grant message, a processor, and a memory. The memory may store code executable by the processor. In a further embodiment, the code may include code that determines a frame period to transmit multiple consecutive uplink subframes based on a portion of the uplink grant message. In certain embodiments, the code may include code that determines a number of the multiple consecutive uplink subframes to transmit based on the portion of the uplink grant message. The apparatus, in one embodiment, includes a transmitter that transmits the number of the multiple consecutive uplink subframes starting at a first subframe of the frame period.

Another method for burst-based transmission scheduling, in one embodiment, includes receiving, by use of a processor, an uplink grant message. In some embodiments, the method includes determining a frame period to transmit multiple consecutive uplink subframes based on a portion of the uplink grant message. In a further embodiment, the method includes determining a number of the multiple consecutive uplink subframes to transmit based on the portion of the uplink grant message. In one embodiment, the method includes transmitting the number of the multiple consecutive uplink subframes starting at a first subframe of the frame period.

In some embodiments, the method includes using only part of a last subframe of the multiple consecutive uplink subframes to transmit data if a transmission time for the number of the multiple consecutive uplink subframes is equal to the frame period. In one embodiment, determining the number of the multiple consecutive uplink subframes based on the portion of the uplink grant message includes identifying the number of the multiple consecutive uplink subframes in the uplink grant message. In such an embodiment, determining the number of the multiple consecutive uplink subframes based on the portion of the uplink grant message includes identifying an offset for a last subframe of the multiple consecutive uplink subframes relative to a starting subframe of the multiple consecutive uplink subframes. In certain embodiments, a maximum duration of the multiple consecutive uplink subframes is a maximum channel occupancy time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a schematic block diagram illustrating one embodiment of a UL grant message;

FIG. 5B is a schematic block diagram illustrating another embodiment of a UL grant message;

DETAILED DESCRIPTION

Figure 1:
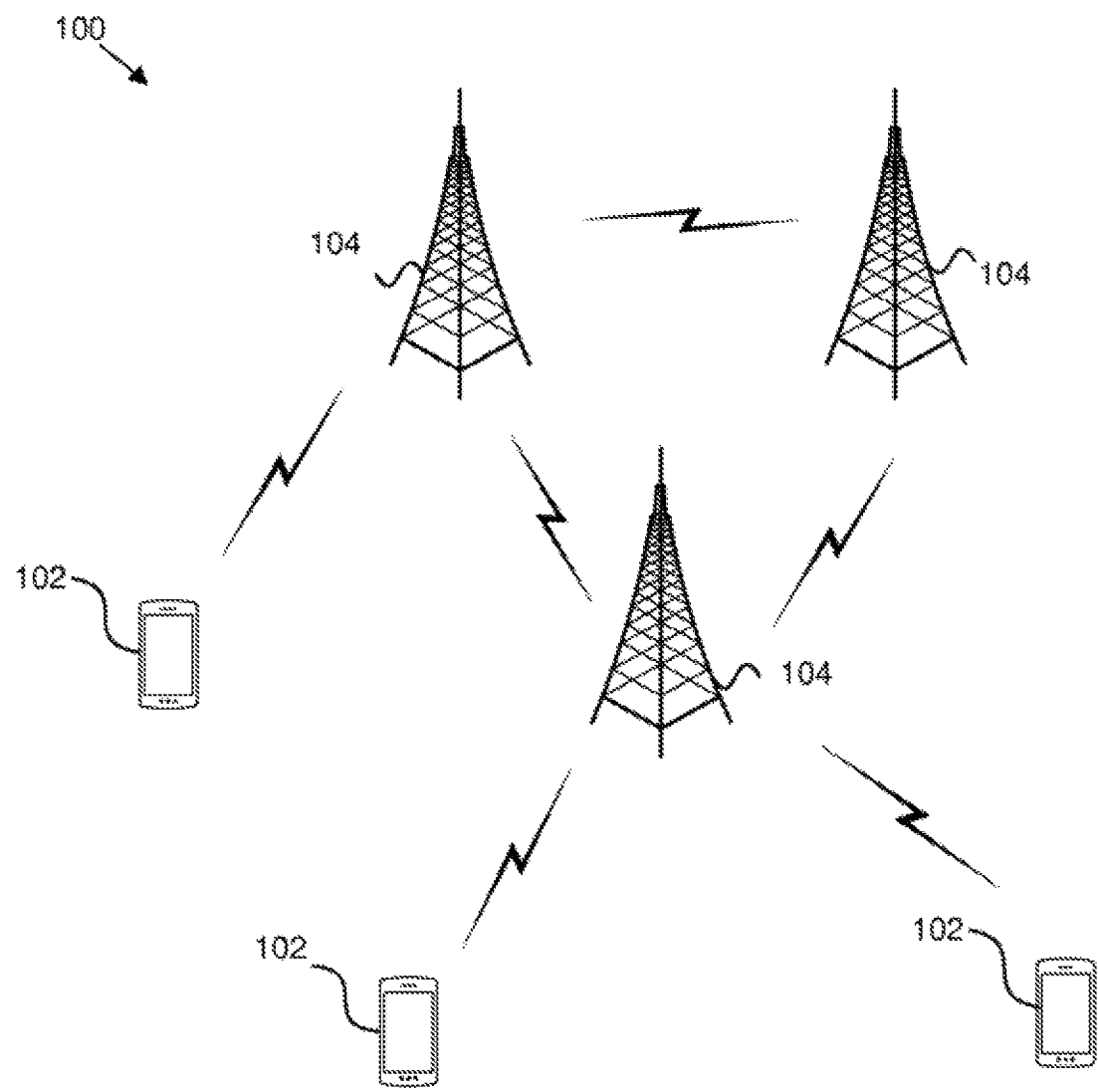
FIG. 1 is a schematic block diagram illustrating one embodiment of a wireless communication system for burst-based transmission.

As will be appreciated by one skilled in the art, aspects of the embodiments may be embodied as a system, apparatus, method, a program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following, an electrical connection having one of more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user'computer, partly on the user'computer, as a stand-alone software package, partly on the user'computer and partly on a remote computer or entirely on the remote computer or server. In the latter scenario, the remote computer may be connected to the user'computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "and," and "the" also refer to "one or more" unless expressly specified otherwise.

Furthermore, the described features, structures, or characteristics of the embodiments may be combined in nay suitable manner. In the following description, numerous specific details are provided, such as examples of programming, software modules, user selections, network transactions, database queries, database structures, hardware modules, hardware circuits, hardware chips, etc., to provided a thorough understanding of embodiment. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for burst-based transmission. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), table computers, smart phones, smart televisions (e.g., televisions connected to the Internet), set-top boxes, game consoles, security systems (including security cameras), vehicle on-board computer, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well know generally by those having ordinary skill in the art.

In one implementation, the wireless communication 100 is compliant with the LTE of the 3GPP UMTS protocol, wherein the base unit 104 transmits using an OFDM modulation scheme or the DL and the remote units 102 transmit on the UL using a SC-FDMA scheme. More generally, however, the wireless communication system 100 may implement some other open or proprietary communication protocol, for example WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may determine multiple consecutive UL subframes to be transmitted from a remote unit 102. The base unit 104 may form an UL grant message to schedule transmission of the multiple consecutive UL subframes. Moreover, the base unit 104 may provide the UL grant message to the remote unit 102. In certain embodiments, the remote unit 102 may receive the UL grant message. In addition, the remote unit 102 may determine a frame period to transmit the multiple consecutive UL subframes based on a portion of the UL grant message. Furthermore, the remote unit 102 may determine a number of the multiple consecutive UL subframes to transmit based on the portion of the UL grant message. The remote unit 102 may transmit the number of the multiple consecutive UL subframes starting or a first subframe of the frame period.

Figure 2:
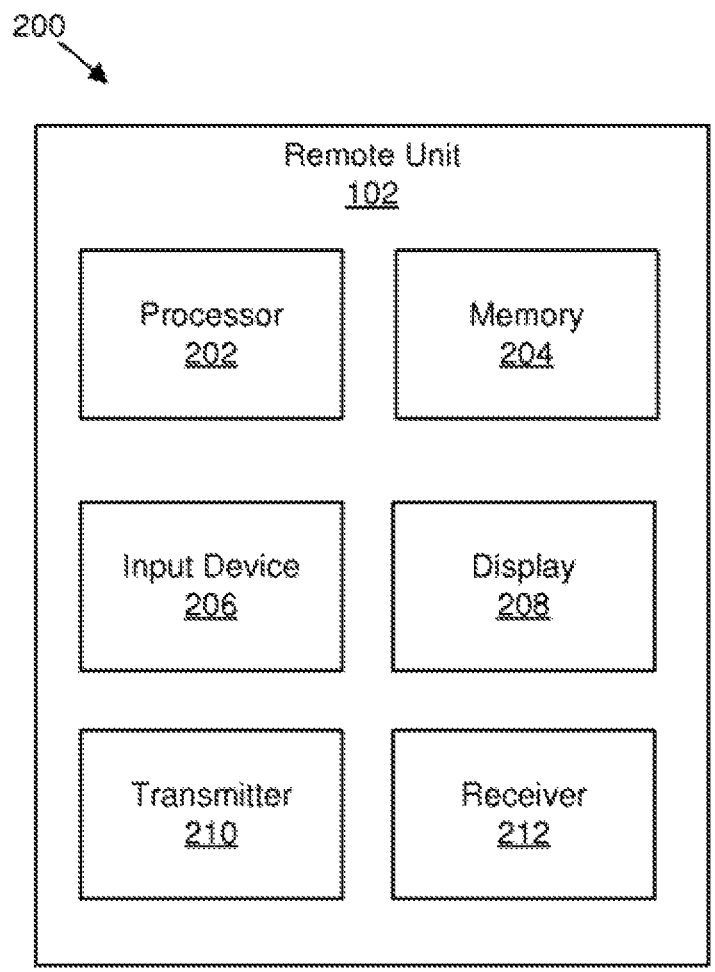
FIG. 2 is a schematic block diagram illustrating one embodiment of an apparatus that may be used for burst-based transmission.

FIG. 2 depicts one embodiment of an apparatus 200 that may be used for burst-based transmission. The apparatus 200 includes one embodiment of the remote unit 102. Furthermore, the remote unit 102 may include a processor 202, a memory 204, an input device 206, a display 208, a transmitter 210, an a receiver 212. In some embodiments, the input device 206 and the display 208 are combined into a single device, such as a touchscreen.

The processor 202, in one embodiment, may include an known controller capable of executing computer-readable instructions and/or capable of performing logical operations. For example, the processor 202 may be a microcontroller, a microprocessor, a central processing unit ("CPU"), a graphics processing unit ("CPU"), an auxiliary processing unit, a field programmable grate array ("FPGA"), or similar programmable controller. In some embodiments, the processor 202 executes instructions stored in the memory 204 to perform the methods and routine described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes a both volatile and non-volatile computer storage media. In some embodiments, the memory 204 also stores program code and related data, such as a operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit multiple consecutive UL subframes to the base unit 104 starting at a first subframe of a frame period. In such an embodiment, a number of the multiple consecutive UL subframes may be provided to the remote unit 102 by the base unit 104, and the remote unit 102 may use the transmitter 210 to transmit the number of the multiple consecutive UL subframes to the base unit 104. For example, the base unit 104 may provide the number six to the remote unit, and the remote unit 102 may use the transmitter 210 to transmit six multiple consecutive UL subframes to the base unit 104. In another embodiment, the receiver 212 may receive a UL grant message sent by the base unit 104. Although only one transmitter 210 and one receiver 212 are illustrated, the remote unit 102 may have an suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
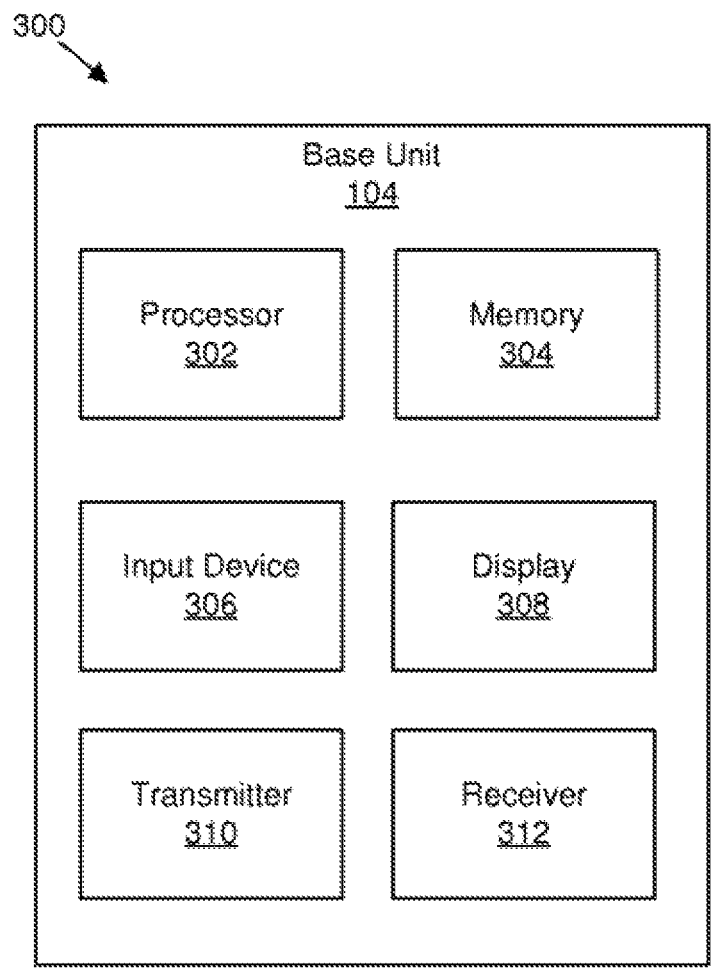
FIG. 3 is a schematic block diagram illustrating another embodiment of an apparatus that may be used for burst-based transmission.

FIG. 3 depicts another embodiment of an apparatus 300 that may be used for burst-base transmission. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The transmitter 310 is used to provide DL communication signals to the remote unit 102 and the receiver 312 is used to receive UL communication signals from the remote unit 102. In one embodiment, the transmitter 310 is used to provide a UL grant message to the remote unit 102 (e.g., UE). Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
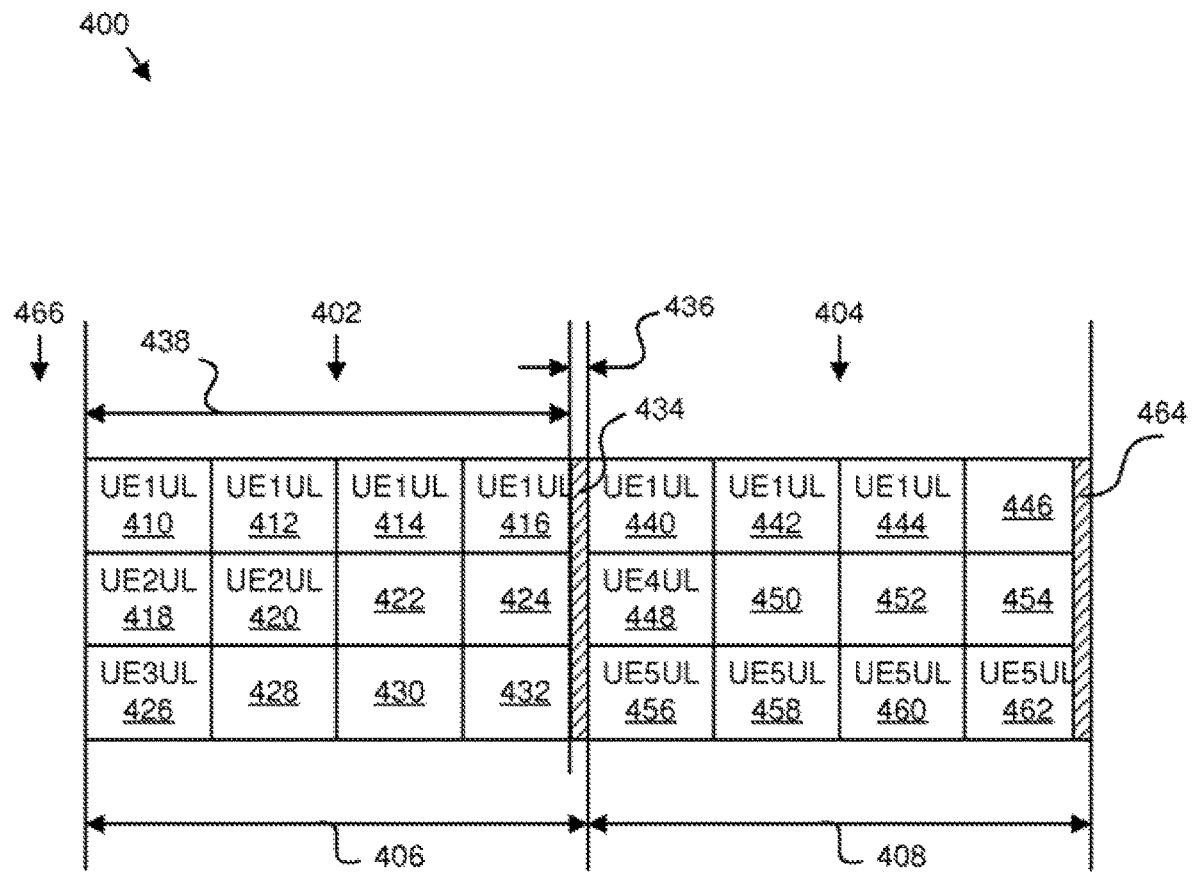
FIG. 4 illustrates one embodiment of a frame configuration that facilitates burst-based transmission.

FIG. 4 depicts one embodiment of a frame configuration 400 that facilitates burst-based transmission. The frame configuration 400 represents data transmitted between a remote unit 102 and a base unit 104. In the illustrated embodiment, the frame configuration 400 includes a first frame 402 and a second frame 404. The first frame 402 has a frame period 406 of 4 ms and the second frame 404 has a frame period 408 of 4 milliseconds ("ms"). The first and second frames 402 and 404 each include four subframes, with each subframe having a period of 1 ms. As may be appreciated, the frame periods 406 and 408 of 4 ms are examples of possible frame periods. In other embodiments, the frame period may be 1 ms, 2 ms, 3 ms, 5 ms, 6 ms, 7 ms, 8 ms, 9 ms, or 10 ms, for example. Furthermore, while the first and second frames 402 and 404 are illustrated, the frame configuration 400 may have any number of frames. In addition, each of the first and second frames 402 and 404 may have any suitable number of subframes, with each subframe having any suitable period. For example, one or more of the first and second frames 402 and 404 may have 1, 2, 3, 4, 5, 6, 7, 8, 9, or 10, for example.

As illustrated, each of the first and second frames 402 and 404 has multi-user multiplexing. As such, data from multiple UEs is multiplexed during each of the first and second frames 402 and 404. Although data from three UEs is multiplexed in each of the first and second frames 402 and 404, data from any suitable number of UEs may be multiplexed during each of the first and second frames 402 and 404.

Within the first frame 402, UL data from a first remote unit 102 (e.g., UE1UL) 410, 412, 414, and 416 is transmitted to a base unit 104 during three subframes and one partial subframe, while UL data from a second remote unit 102 (e.g., UE2UL) 418, and 420 is transmitted to the base unit 104 during two subframes. The subframes 422 and 424 do not include UE2 or UE3 data. In certain embodiments, subframes 422 and 424 may be used by UE1. Moreover, also within the first frame 402. UL data from a third remote unit 102 (e.g., UE3UL) 426 is transmitted to the base unit 104 during one subframe with the subframes 428, 430, and 432 not including UE3 data.

As may be appreciated, the first frame 402 includes an idle period 434 at the end of the frame. The idle period 434 decreases the time available for UL data by a portion of the fourth subframe. Specifically, the idle period 434 has an idle duration 436 that when added with a maximum channel occupancy time 438 equals the frame period 406. According to ETSI rules of FBE, the idle duration 436 is at least 5% of the maximum channel occupancy time 438. It should be noted that UL data is only transmitted during the maximum channel occupancy time 438, therefore a maximum of three subframes and one partial subframe of UL data may be transmitted during one frame period. Furthermore, LBT/CCA occurs at the end of the idle period 434.

Within the second frame 404, UL data from the first remote unit 102 (e.g., UE1UL) 440, 442, and 444, is transmitted to the base unit 104 during three subframes, while UL data from a fourth remote unit 102 (e.g. UE4UL) 448 is transmitted to the base unit 104 during one subframes. The subframes 450, 452, and 454 do not include UE4 data. Moreover, also within the second frame 404. UL data from a fifth remote unit 102 (e.g., UE5UL) 456, 458, 460, and 462 is transmitted to the base unit 104 during three subframes and one partial subframe. The second frame 404 includes an idle period 464 at the end of the frame.

Burst-based transmission from the base unit 104 may be used for a LAA UL grant message 466 in order to save signaling overhead of the licensed carrier when cross-scheduling from a licensed carrier to schedule unlicensed secondary carriers. Specifically, the burst is scheduled for LAA UL from the base unit 104 to a remote unit 102 using only one UL grant message 466 to schedule multiple consecutive UL subframes.

In certain embodiments, the UL grant message 466 is transmitted at least 4 ms before the starting frame of a corresponding frame period. From a single remote unit 102 perspective, the UL grant message 466 can be transmitted only once for each frame period. Accordingly, the UL grant message 466 is transmitted prior to the first frame 402, however, the UL grant message 466 grants UL transmissions for the second frame 404 to enable 4 ms to elapse between the UL grant message 466 and the corresponding frame period.

As illustrated, the UL transmission from the remote units 102 start the first UL subframe for each frame period (e.g., UE1UL 410, UE2UL 418, UE3UL 426, UE1UL 440, UE4UL 448, and UE5UL 456). Moreover, the maximum duration of UL transmission is equal to the maximum channel occupancy time 438. Information corresponding to the burst duration is contained in the UL grant message 466 from the base unit 104 to schedule multiple consecutive subframes for one remote unit 102 with the same frequency resource and MCS because the remote unit's 102 UL transmission is fully dependent on the base unit's 104 scheduling decision.

For example, in one embodiment, a number of multiple consecutive UL subframes is contained in the UL grant message 466. Specifically, in the European Union ("EU"), 4 bits may be used to cover a burst length from 1 ms to 10 ms (e.g., the 4 bits will cover possible numbers of 1-10 consecutive UL subframes), while in Japan, 2 bits may be used to cover a burst length from 1 ms to 4 ms (e.g., the 2 bits will cover possible numbers of 1-4 consecutive UL subframes— "00"=1 subframe, "11"=4 subframes). In another example, an offset for the last subframe with respect to the starting subframe in the frame period may be indicated in the UL grant message 466. In such an example, the first subframe in the 4 ms frame period may be considered subframe 0 and the fourth subframe may be considered subframe 3, so the UL grant message 466 may indicate a binary "11" to indicate that the last subframe for the current burst transmission is subframe 3, so this the last subframe for a UL frame period that is 4.

In one embodiment, if the duration of the burst-base transmission indicated by the UL grant message 466 is equal to the frame period, the remote unit 102 may treat the last UL subframe as a partial subframe with a fixed number of OFDM symbols reserved for the idle period 464. For example, if the frame period is set to 10 ms, the maximum channel occupancy time 438 will enable 9 full subframes and one partial subframe. In such an example, the partial subframe has a length of 7 OFDM symbols, and the idle period 464 includes 7 OFDM symbols, thereby giving the idle period 464 at least 5% of the maximum channel occupancy time 438.

Figures 5A, 5B:
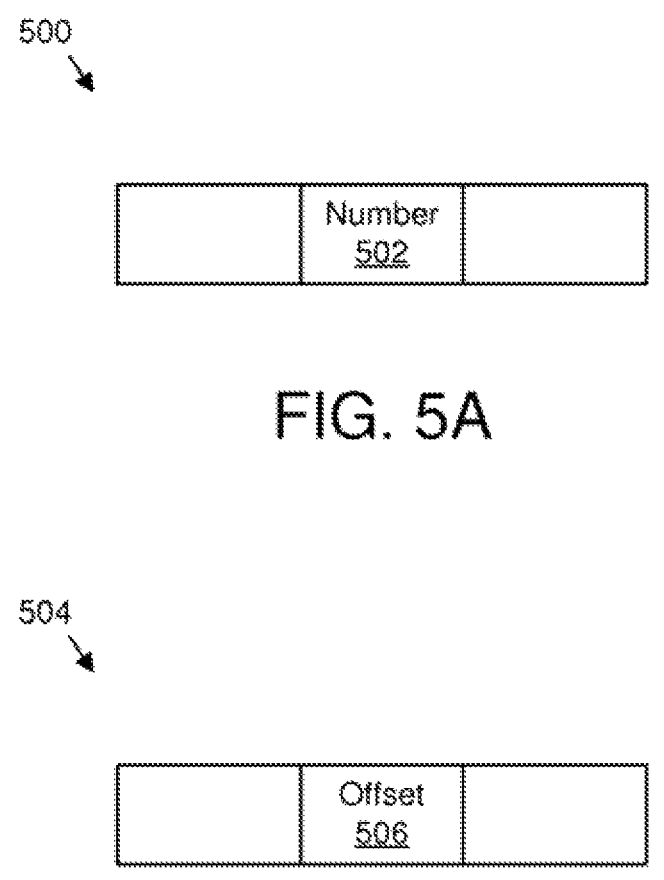

FIG. 5A is a schematic block diagram illustrating one embodiment of a UL grant message 500, which may be substantially similar to the UL grant message 466. The UL grant message 500 includes a number 502. The number 502 is the number of multiple consecutive UL subframes to be transmitted by the remote unit 102. For example, the number may be 1, 2, 3, 4, 5, 6, 7, 8, 9, or 10, to indicate the number of consecutive UL subframes to be transmitted by the remote unit 102 to the base unit 104. Although the number 502 is illustrated as being toward the central portion of the UL grant message 500, the number 502 may be positioned at any location within the UL grant message 500.

FIG. 5B is a schematic block diagram illustrating another embodiment of a UL grant message 504, which may be substantially similar to the UL grant message 466. The UL grant message 504 includes an offset 506. The offset 506 may be an offset for the last subframe with respect to the starting subframe in the frame period. For example, if the starting subframe is subframe 0, an offset of 1 would represent subframe 1, while the actual number of subframes to be transmitted by the remote unit 102 would be 2. As another example, if the starting subframe is subframe 0 and the last subframe is subframe 6, an offset of 6 would represent subframe 6, while the actual number of subframes to be transmitted by the remote unit 102 would be 7.

Figure 6:
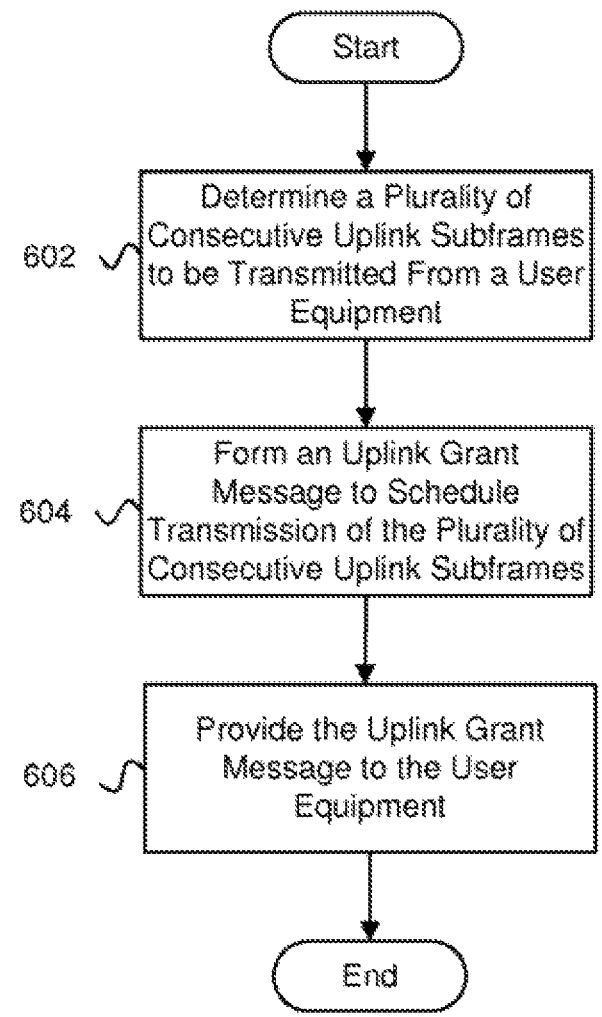
FIG. 6 is a schematic flow chart diagram illustrating one embodiment of a method for burst-based transmission from a base unit.

FIG. 6 is a schematic flow chart diagram illustrating one embodiment of a method 600 for burst-based transmission from a base unit 104. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include determining 602 multiple (e.g., a plurality of) consecutive UL subframes to be transmitted from a remote unit 102 (e.g., UE). For example, the method 600 may determine a number of consecutive subframes that are to be transmitted from the remote unit 102. In certain embodiments, the remote unit 102 may provide a request to the base unit 104 including a number of subframes to be transmitted from the remote unit 102.

The method 600 may also include forming 604 a UL grant message (e.g., UL grant message 466) to schedule transmission of the multiple consecutive UL subframes. In certain embodiments, forming 604 the UL grant message to schedule transmission of the multiple consecutive UL subframes includes forming the UL grant message to indicate a number (e.g., number 502) of the multiple consecutive UL subframes to be transmitted from the remote unit 102. In such embodiments, forming the UL grant message to indicate the number of the multiple consecutive UL subframes to be transmitted from the remote unit 102 includes forming the UL grant message to include two bits or four bits to indicate the number of the multiple consecutive UL subframes to be transmitted from the remote unit 102. In some embodiments, forming 604 the UL grant message to schedule transmission of the multiple consecutive UL subframes includes forming the UL grant message to indicate an offset (e.g., offset 506) for a last subframe of the multiple consecutive UL subframes to be transmitted from the remote unit 102 relative to a starting subframe of the multiple consecutive UL subframes.

The method 600 may provide 606 the UL grant message to the remote unit 102. Then the method 600 may end. In certain embodiments, the transmitter 310 of the base unit 104 may provide 606 the UL grant message to the remote unit 102. In one embodiment, providing 606 the UL grant message to the remote unit 102 may include providing period the UL grant message to the remote unit 102 at least four ms before a first subframe in a frame period that is to include the multiple consecutive UL subframes. In some embodiments, a first UL subframe of the multiple consecutive UL subframes is the first subframe in the frame period. In one embodiment, a maximum duration of the multiple consecutive UL subframes is a maximum channel occupancy time (e.g., maximum channel occupancy time 438).

Figure 7:
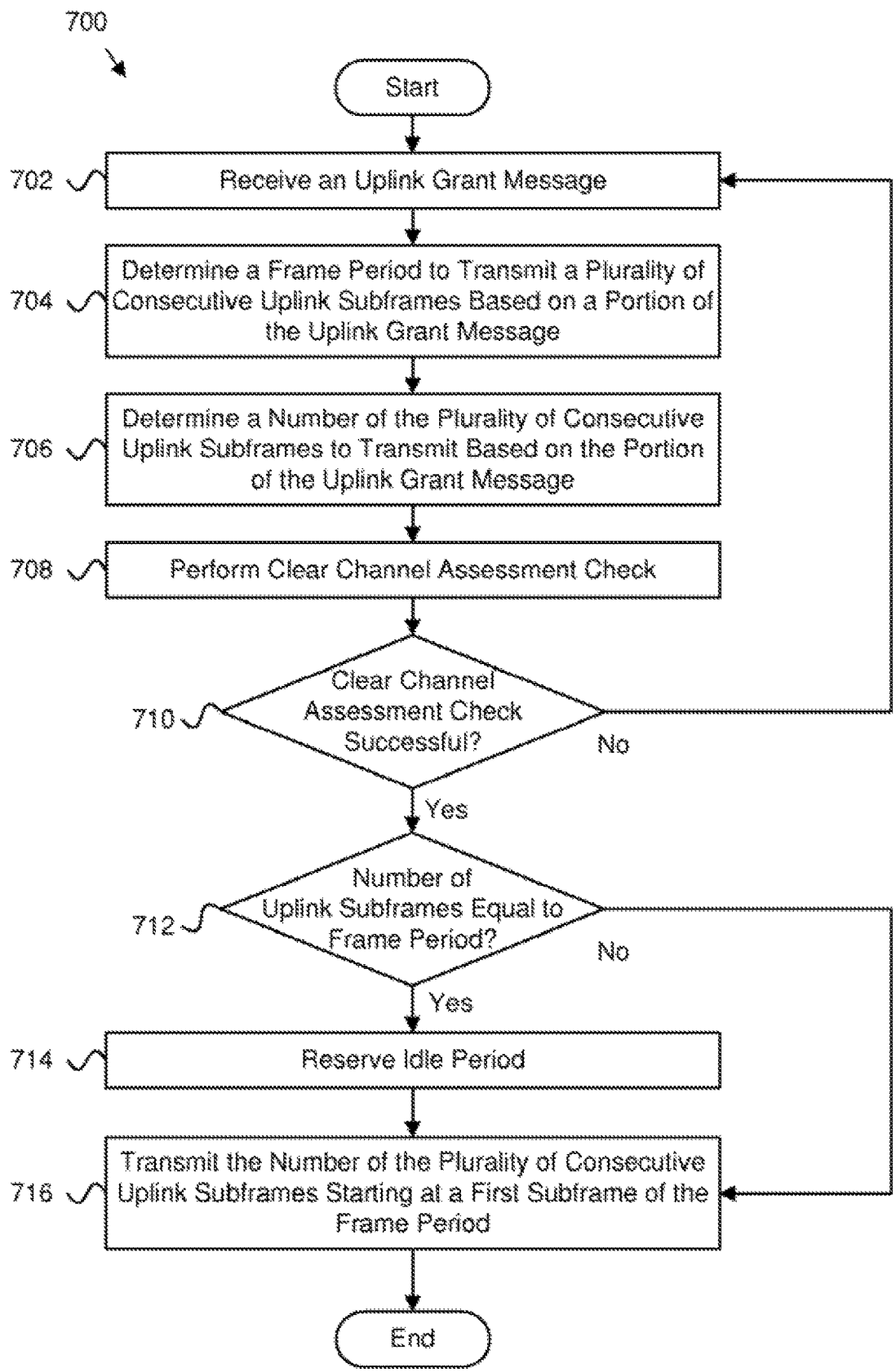
FIG. 7 is a schematic flow chart diagram illustrating one embodiment of a method for a remote unit to receive burst-based transmission from a base unit.

FIG. 7 is a schematic flow chart diagram illustrating one embodiment of a method 700 for a remote unit 102 to receive burst-based transmission from a base unit 104. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a UL grant message (e.g., UL grant message 466). In one embodiment, the receiver 212 of the remote unit 102 may receive the UL grant message. The method 700 may also include determining 704 a frame period to transmit multiple (e.g., a plurality of) consecutive UL subframes based on a portion of the UL grant message. The portion of the UL grant message may be anything that corresponds to the UL grant message including data contained within the UL grant message (e.g., the number 502, the offset 506, etc.), data relating to receipt of the UL grant message (e.g., a time that the UL grant message was received, etc.), and so forth. In certain embodiments, the frame period is at least four ms from the time of the receipt of the UL grant message. In one embodiment, the frame period to transmit multiple consecutive UL subframes is the frame period that beings after four ms expires, in another embodiment, the UL grant message may specify a delay of any suitable number of frame periods.

The method 700 may determine 706 a number of the multiple consecutive UL subframes to transmit based on the portion of the UL grant message. In one embodiment, determining 706 the number of the multiple consecutive UL subframes based on the portion of the UL grant message includes identifying the number (e.g., the number 502) of the multiple consecutive UL subframes in the UL grant message. In another embodiment, determining 706 the number of the multiple consecutive UL subframes based on the portion of the UL grant message includes identifying an offset (e.g., the offset 506) for a last subframe of the multiple consecutive UL subframes relative to a starting subframe of the multiple consecutive UL subframes.

The method 700 may include performing 708 a CCA check. In certain embodiments, the remote unit 102 may perform 708 the CCA check. The method 700 then determines 710 whether the CCA check was successful. If the CCA check is not successful, the method 700 may return to receiving 702 a UL grant message. However, if the CCA check is successful, the method 700 then determines 712 whether the number of the multiple consecutive UL subframes is equal to the frame period. If the number of the multiple consecutive UL subframes is equal to the frame period, the method 700 may include reserving 714 the idle period within the last subframe so that only part of the last subframe is used for UL data, then proceeds to transmitting 716. If the number of the multiple consecutive UL subframes is less than the frame period, the method 700 proceeds to transmitting 716 without reserving 714 the idle period.

The method 700 may include transmitting 716 the number of the multiple consecutive UL subframes starting at a first subframe of the frame period. Then the method 700 may end. In one embodiment, the transmitter 210 may transmit the number of the multiple consecutive UL subframes starting at the first subframe of the frame period. For example, the transmitter 210 may transmit 2, 3, 4, 5, 6, 7, 8, 9, 10, or more multiple consecutive UL subframes starting at the first subframe of the frame period. In some embodiments, the method 700 may include using only part of a last subframe of the multiple consecutive UL subframes to transmit data if a transmission time for the number of the multiple consecutive UL subframes is equal to the frame period. In certain embodiments, a maximum duration of the multiple consecutive UL subframes is a maximum channel occupancy time (e.g., maximum channel occupancy time 438).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor;
   a memory that stores code executable by the processor, the code comprising:
   code that determines a plurality of consecutive uplink subframes to be transmitted from a user equipment, wherein the plurality of consecutive uplink subframes are part of an uplink burst transmission and the same frequency resource and modulation and coding scheme are used in each uplink subframe of the plurality of consecutive uplink subframes; and
   code that forms an uplink grant message to schedule transmission of the plurality of consecutive uplink subframes, wherein:
      the uplink grant message indicates a number of the plurality of consecutive uplink subframes to be transmitted from the user equipment;
      a maximum number of consecutive uplink subframes scheduled by the uplink grant message is four; and
      the consecutive uplink subframes are part of a frame comprising ten subframes; and
   a transmitter that provides the uplink grant message to the user equipment.

2. The apparatus of claim 1, wherein the code that forms the uplink grant message to indicate the number of the plurality of consecutive uplink subframes to be transmitted from the user equipment comprises code that forms the uplink grant message to include four bits to indicate the number of the plurality of consecutive uplink subframes to be transmitted from the user equipment.

3. The apparatus of claim 1, wherein the code that forms the uplink grant message to indicate the number of the plurality of consecutive uplink subframes to be transmitted from the user equipment comprises code that forms the uplink grant message to include two bits to indicate the number of the plurality of consecutive uplink subframes to be transmitted from the user equipment.

4. The apparatus of claim 1, wherein the code that forms the uplink grant message to schedule transmission of the plurality of consecutive uplink subframes comprises code that forms the uplink grant message to indicate an offset for a last subframe of the plurality of consecutive uplink subframes to be transmitted from the user equipment relative to a starting subframe of the plurality of consecutive uplink sub frames.

5. The apparatus of claim 1, wherein the transmitter provides the uplink grant message to the user equipment at least four milliseconds before a first subframe of a frame period that is to include the plurality of consecutive uplink subframes.

6. A method comprising:
   determining, by use of a processor, a plurality of consecutive uplink subframes to be transmitted from a user equipment, wherein the plurality of consecutive uplink subframes are part of an uplink burst transmission and the same frequency resource and modulation and coding scheme are used in each uplink subframe of the plurality of consecutive uplink subframes;
   forming an uplink grant message to schedule transmission of the plurality of consecutive uplink subframes, wherein:
      the uplink grant message indicates a number of the plurality of consecutive uplink subframes to be transmitted from the user equipment;
      a maximum number of consecutive uplink subframes scheduled by the uplink grant message is four; and
      the consecutive uplink subframes are part of a frame comprising ten subframes; and
   providing the uplink grant message to the user equipment.

7. The method of claim 6, wherein a first uplink subframe of the plurality of consecutive uplink subframes is a first subframe of a frame period.

8. The method of claim 6, wherein a maximum duration of the plurality of consecutive uplink subframes is a maximum channel occupancy time.

9. The method of claim 8, wherein forming the uplink grant message to indicate the number of the plurality of consecutive uplink subframes to be transmitted from the user equipment comprises forming the uplink grant message to include four bits to indicate the number of the plurality of consecutive uplink subframes to be transmitted from the user equipment.

10. The method of claim 8, wherein forming the uplink grant message to indicate the number of the plurality of consecutive uplink subframes to be transmitted from the user equipment comprises forming the uplink grant message to include two bits to indicate the number of the plurality of consecutive uplink subframes to be transmitted from the user equipment.

11. The method of claim 6, wherein forming the uplink grant message to schedule transmission of the plurality of consecutive uplink subframes comprises forming the uplink grant message to indicate an offset for a last subframe of the plurality of consecutive uplink subframes to be transmitted from the user equipment relative to a starting subframe of the plurality of consecutive uplink subframes.

12. The method of claim 6, wherein providing the uplink grant message to the user equipment comprises providing the uplink grant message to the user equipment at least four milliseconds before a first subframe of a frame period that is to include the plurality of consecutive uplink subframes.

13. An apparatus comprising:
   a receiver that receives an uplink grant message;
   a processor;
   a memory that stores code executable by the processor, the code comprising:
   code that determines a frame period to transmit a plurality of consecutive uplink subframes based on a portion of the uplink grant message; and
   code that determines a number of the plurality of consecutive uplink subframes to transmit based on the portion of the uplink grant message, wherein the plurality of consecutive uplink subframes are part of an uplink burst transmission and the same frequency resource and modulation and coding scheme are used in each uplink subframe of the plurality of consecutive uplink subframes, wherein:
      the uplink grant message indicates the number of the plurality of consecutive uplink subframes to be transmitted;
      a maximum number of consecutive uplink subframes scheduled by the uplink grant message is four; and
      the consecutive uplink subframes are part of a frame comprising ten subframes; and
   a transmitter that transmits the number of the plurality of consecutive uplink subframes starting at a first subframe of the frame period.

14. A method comprising:
receiving, by use of a processor, an uplink grant message;
determining a frame period to transmit a plurality of consecutive uplink subframes based on a portion of the uplink grant message;
determining a number of the plurality of consecutive uplink subframes to transmit based on the portion of the uplink grant message, wherein the plurality of consecutive uplink subframes are part of an uplink burst transmission and the same frequency resource and modulation and coding scheme are used in each uplink subframe of the plurality of consecutive uplink subframes, wherein:
the uplink grant message indicates the number of the plurality of consecutive uplink subframes to be transmitted;
a maximum number of consecutive uplink subframes scheduled by the uplink grant message is four; and
the consecutive uplink subframes are part of a frame comprising ten subframes; and
transmitting the number of the plurality of consecutive uplink subframes starting at a first subframe of the frame period.

15. The method of claim 14, comprising using only part of a last subframe of the plurality of consecutive uplink subframes to transmit data if a transmission time for the number of the plurality of consecutive uplink subframes is equal to the frame period.

16. The method of claim 14, wherein determining the number of the plurality of consecutive uplink subframes based on the portion of the uplink grant message comprises identifying the number of the plurality of consecutive uplink subframes in the uplink grant message.

17. The method of claim 14, wherein determining the number of the plurality of consecutive uplink subframes based on the portion of the uplink grant message comprises identifying an offset for a last subframe of the plurality of consecutive uplink subframes relative to a starting subframe of the plurality of consecutive uplink subframes.

18. The method of claim 14, wherein a maximum duration of the plurality of consecutive uplink subframes is a maximum channel occupancy time.

* * * * *